P. KESLER.
WAGON BRAKE.
APPLICATION FILED AUG. 7, 1912.

1,063,545.

Patented June 3, 1913.

Witnesses

Peter Kesler  Inventor
by
Attorneys

UNITED STATES PATENT OFFICE.

PETER KESLER, OF MONROE, WISCONSIN.

WAGON-BRAKE.

1,063,545. Specification of Letters Patent. Patented June 3, 1913.

Application filed August 7, 1912. Serial No. 713,833.

*To all whom it may concern:*

Be it known that I, PETER KESLER, a citizen of the United States, residing at Monroe, in the county of Green and State of Wisconsin, have invented a new and useful Wagon-Brake, of which the following is a specification.

The present invention relates to improvements in wagon brakes, the primary object of the invention being the provision of a braking mechanism controlled from the forward end of the tongue of the wagon and operated to braking position due to the draft animals pulling backwardly upon the yoke, the same being especially desirable when the vehicle is moving down grade.

A further object of the present invention is the provision of a novel form of wagon brake in which the brake beam is connected to the rear hounds of the running gear and is operated through a flexible connection connected to the extreme forward ends of the hounds adjacent the front axle, so that the brakes may be operated when the vehicle is on grade, in line or rounding a curve.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
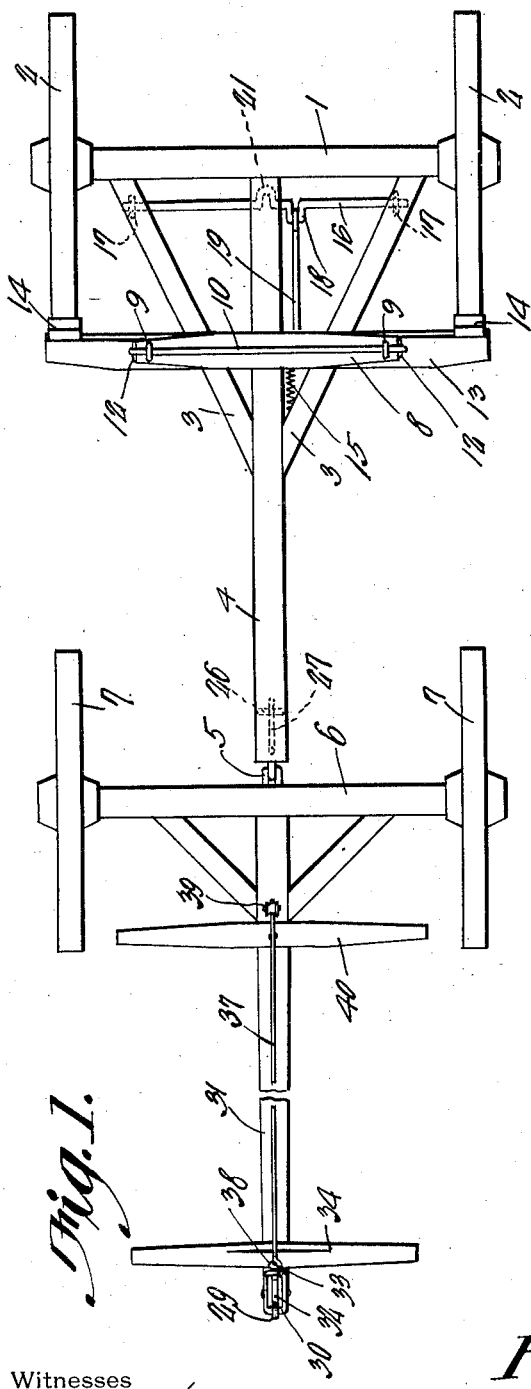
Figure 2:
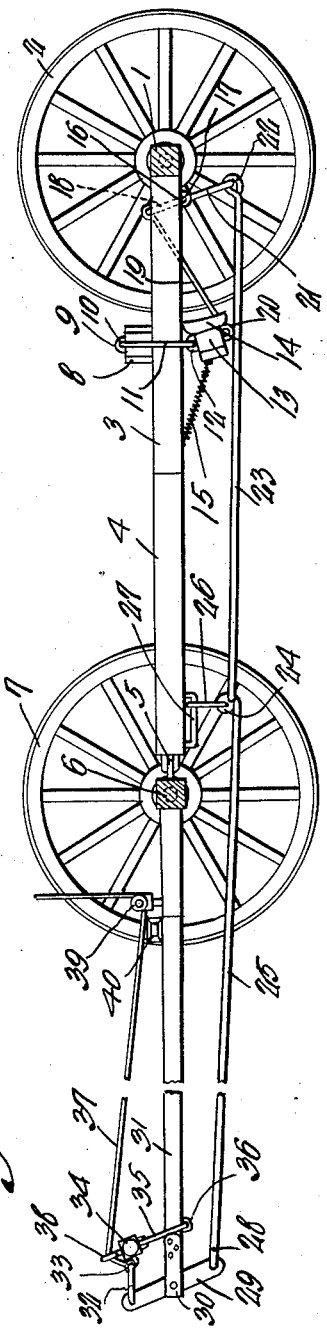

In the drawings—Figure 1 is a top plan view of a vehicle running gear with the present invention attached thereto. Fig. 2 is a side elevation of the same with the front and rear wheels at the near side removed.

Referring to the drawings, the numeral 1 designates the rear axle carrying the two rear wheels 2 and having the forward hounds 3 connected forwardly thereof and carrying the reach rod or bar 4, the forward end of which is connected by means of the universal joint 5 to the front axle 6, provided with the usual front wheels 7.

Connected to the upper face of the hounds 3 is a bar 8 carrying the eye-bolts 9 in which is journaled the shaft 10, said shaft 10 being provided with the two downwardly projecting arms 11, whose ends are connected in turn to the respective eye-bolts 12 to swingingly support the brake beam 13. This brake beam 13 is provided with the two brake shoes 14 disposed in operable relation to the tires of the respective rear wheels. The spring 15 is connected to the running gear and also to the brake beam 13 and normally holds the brake shoes 14 out of engagement with the tires of the wheels.

A shaft 16 has its respective ends journaled in the eye-bolts 17 connected to the under side of the hounds 3 adjacent to the axle 1 and is provided with the two cranks 18 and 21. The crank 18 extends upwardly and has connected thereto, a link 19 whose other end is connected to the eye-bolt 20 of the brake beam 13, so that when the shaft 16 is oscillated, the brake beam is then moved toward the rear wheels 2.

In order to properly oscillate the shaft 16 which is in reality a rock shaft, the crank arm 21 depends downwardly and in an opposite direction to the arm 18 and has connected thereto the eye 22 of the rod 23, whose other end is connected to the eye 24 of the rod 25, being in reality a continuation of the rod 23 and extending forwardly of the front axle and below the tongue 31. In order to properly support the connection between the rods 23 and 25 relatively to the reach bar 4 so as to permit of the proper turning of the vehicle without interfering with the actuation of the brake beam 13, a ring 26 is connected to the eye 24 and is slidably mounted upon the bail 27 connected to and depending from the under side of the forward end of the reach bar 4. By this means the connection between the rods 23 and 25 is properly elevated and is permitted the necessary universal movement due to the manipulation of the brake beam 13 and to the action of the front axle with relation to the rear axle.

The forward end 28 of the rod 25 is flexibly connected to the depending end of the double lever 29 which is pivoted in the connection 30, mounted and connected to the forward end of the tongue 31, while the upper end of the double lever 29 is connected to a link 32, which through the hook 33 is operably connected to the yoke 34 which as shown is connected to the tongue through the medium of the link 35 and eye-bolt 36.

By this construction it will be seen that the rearward movement of the draft animals due to the passing down grade of the vehicle or the backing of the animals will cause the yoke 34 to be pulled rearwardly from the position, as shown in Fig. 2, so that the lower end of the bar 29 will be moved forwardly and through the rods 25 and 23 the brake beam 13 will be moved to place the brake shoes 14 into engagement with the tires of the rear wheels 2 and against the tension of the spring 15. Thus the brake shoes will be placed in braking position to be automatically returned as soon as the pressure is released from the yoke 34.

In order to release the brake mechanism when the vehicle is being backed, the ring or link 32 is connected to one end of the cable or flexible connection 37 which as shown is threaded through the eye 38 carried by the yoke 34 and is passed through the pulley sheave 39 connected to the tongue back of the double tree and in ready access to the driver, the length of the cable 37 depending upon the position from which it is desired to use the brake, that is from a wagon body or from the top of a load of hay or fodder. By this means it will be seen that when the cable 37 is pulled upon, that the link 32 will be released from the hook 33 of the neck yoke 34, and thus the spring 15 will move the brake beam 13 from the rear wheels while the wagon may be readily backed through the neck yoke as usual. The movement of the draft animals forward will cause the hook 33 to be placed in position for the reception of the ring or link 32 when the cable 37 is released by the driver.

What is claimed is:

The combination with a vehicle, a brake, a neck yoke connected to the tongue for vertical swinging movement, and a lever pivoted to the ends of the tongue and operably connected to the brake, of means for connecting and disconnecting the yoke to the upper end of the lever, comprising a link pivoted to the upper end of the lever, a hook carried by the yoke for connecting the link to the yoke, and a flexible connection guided over the yoke and having one end connected to the link, the other end being disposed to be pulled upon from a distant point to disconnect the link from the yoke.

In testimony that I claim the foregoing as my own, I have hereto affixed my signature in the presence of two witnesses.

PETER KESLER.

Witnesses:
J. H. DURST,
OTTO A. TULURDZ,.

---

Copies of this patent may be obtained for five cents each, by addressing the "Commissioner of Patents, Washington, D. C."